(12) United States Patent
Rothman et al.

(10) Patent No.: US 7,539,854 B2
(45) Date of Patent: May 26, 2009

(54) SYSTEM AND METHOD TO SEAMLESSLY ENABLE ENHANCED MANAGEMENT AND SCRIPTING OF A COMPUTER SYSTEM AND ITS ADD-IN DEVICES

(75) Inventors: Michael A. Rothman, Olympia, WA (US); Robert P. Hale, Portland, OR (US); Andrew J. Fish, Olympia, WA (US); Vincent J. Zimmer, Federal Way, WA (US); Mahesh S. Natu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1174 days.

(21) Appl. No.: 10/746,579

(22) Filed: Dec. 24, 2003

(65) Prior Publication Data

US 2005/0144428 A1 Jun. 30, 2005

(51) Int. Cl.
*G06F 7/00* (2006.01)
*G06F 9/00* (2006.01)
*G06F 15/177* (2006.01)
*G06F 17/30* (2006.01)

(52) U.S. Cl. .............................. 713/1; 713/2; 713/100; 707/3

(58) Field of Classification Search ...................... 713/1, 713/2, 100
See application file for complete search history.

(56) References Cited

U.S. PATENT DOCUMENTS

| | | | | |
|---|---|---|---|---|
| 6,161,176 | A * | 12/2000 | Hunter et al. ................... | 713/1 |
| 6,816,963 | B1 * | 11/2004 | Krithivas et al. ............... | 713/1 |
| 7,143,235 | B1 * | 11/2006 | Watanabe et al. ........... | 711/114 |
| 7,233,975 | B1 * | 6/2007 | Gerraty et al. .............. | 709/213 |
| 7,246,224 | B2 * | 7/2007 | Rothman et al. ............... | 713/1 |
| 2005/0090239 | A1 * | 4/2005 | Lee et al. ..................... | 455/418 |
| 2006/0005001 | A1 * | 1/2006 | Sinha et al. ..................... | 713/1 |

OTHER PUBLICATIONS

Candelaria de Ram S., Compiling the Link Grammar System under DOS, Oct. 1997.*

* cited by examiner

*Primary Examiner*—Mark Connolly
(74) *Attorney, Agent, or Firm*—Joni D. Stutman-Horn

(57) ABSTRACT

An embodiment of the present invention is a system and method relating to seamlessly enable enhanced management and scripting of a computer system and its add-in devices. In at least one embodiment, the present invention enables a system administrator or integrator to script a common configuration for multiple devices and then automatically configure the devices using the script. The language construct and central data repository for configuration settings are extended to comprehend a scripting language. A script is read by a script engine during either pre-boot or runtime. The script engine searches a keyword database on the central data repository to determine requested configuration settings. A data offset is corresponding to a specific op-code is used to determine where configuration settings are located, for modification.

34 Claims, 6 Drawing Sheets

Sample IFR Op-code encoding

```
typedef struct {
    EFI_HII_HANDLE      HiiHandle;          //Unique value which correlates to the original HII handle
    UINTN               IfrDataOffset;      //Byte offset from the start of this structure to the IFR data
    UINTN               StringDataOffset;   //Byte offset from the start of this structure to the string data
    UINTN               NumberOfVariableData; //Number of VariableData[] elements in array
    UINTN               NumberOfLanguages;  //How many language string packages are there?
    EFI_DEVICE_PATH     DevicePath;
    //EFI_VARIABLE_CONTENTS  VariableData(); //Contents of Variable information for this entry - guid/name/data
    //EFI_IFR_CONTENTS       IfrData;        //Contents of IFR data for this entry
    //EFI_STRING_CONTENTS    StringData();   //Contents of string data - there may be multiple instances of the
                                             //EFI_STRING_CONTENTS structure defining multiple languages
    EFI_HII_DATA_TABLE
} typedef struct {
    UINTN               NumberOfHiiDataTables; //Number of EFI_HII_DATA_TABLE entries defined in the EXPORT_TABLE
    //EFI_HII_DATA_TABLE  HiiDataTable();      //Variable count of EFI_HII_DATA_TABLE entries. The amount in the
                                               //table corresponds to the value in the NumberOfHiiDataTables
} EXPORT_TABLE
```

*Fig. 6*

SYSTEM AND METHOD TO SEAMLESSLY ENABLE ENHANCED MANAGEMENT AND SCRIPTING OF A COMPUTER SYSTEM AND ITS ADD-IN DEVICES

FIELD OF THE INVENTION

An embodiment of the present invention relates generally to computer configuration and, more specifically, to a system and method to seamlessly enable the management and scripting of many aspects of a computer system and its add-in devices.

BACKGROUND INFORMATION

Various mechanisms exist for identifying and configuring associated hardware devices during pre-boot of a computing device. In a basic computing system there may be dozens, hundreds, or even thousands of configuration options. In existing systems, the options are typically configured manually, i.e., by pressing a function key such as "F1" at setup time and choosing desired parameters. If a system has 100 settings, an experienced user may manually set each of the 100 settings. A less advanced user may only configure 5-10 items.

Each parameter, or option, may determine the performance characteristics of the computing system. In some cases, a user will want a fast device, regardless of power consumption. In other cases, a user might want to save power without regard to performance. In enterprises with many computing devices, it is cumbersome to manually configure each device to the same specifications.

Another problem with existing systems is that there is no simple way to expose standard configuration mechanisms that could be leveraged by a class of platforms in a forms-based configuration infrastructure. Similarly, existing systems do not have the ability to utilize a variety of forms-based configuration questions located in controllable variable destinations to further assist in the standardization of platform configuration.

BRIEF DESCRIPTION OF THE DRAWINGS

The features and advantages of the present invention will become apparent from the following detailed description of the present invention in which:

FIG. 6 shows exemplary background structure definitions illustrating an embodiment of the form of data that may be exported by script engine services.

DETAILED DESCRIPTION

Figure 1:
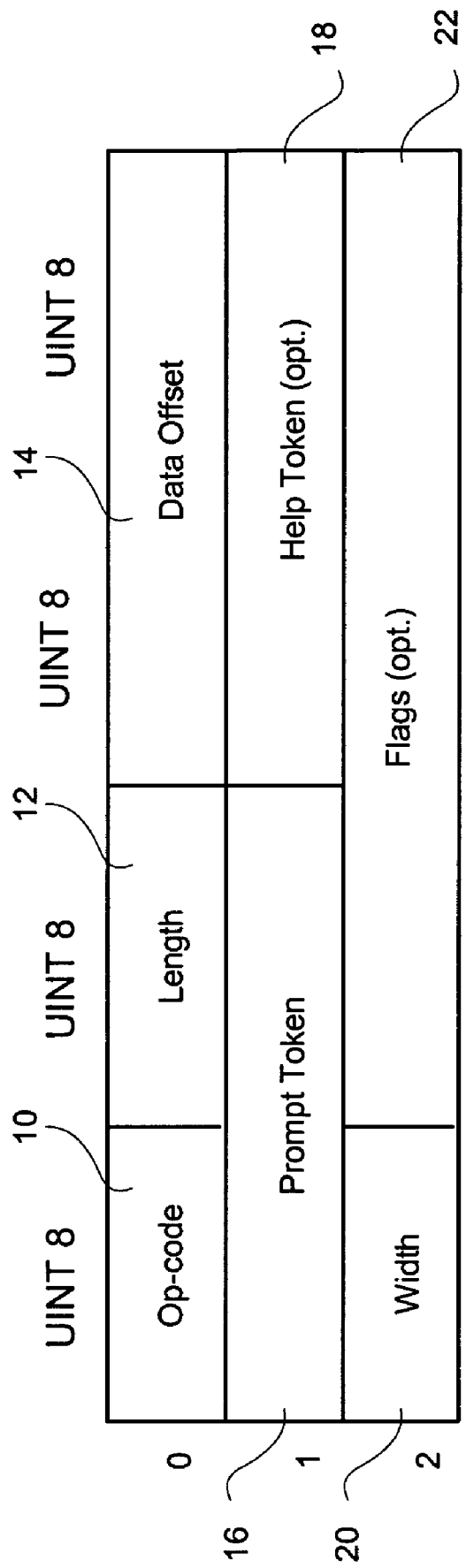
FIG. 1 is a block diagram representation of a sample internal forms representation (IFR) op-code encoding, according to the disclosed system and method.

An embodiment of the present invention is a system and method to seamlessly enable enhanced management and scripting of a computer system and its add-in devices. In at least one embodiment, the present invention is intended to enable a system administrator or integrator to script a common configuration for multiple devices and then automatically configure the devices using the script.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

There is a significant benefit for supporting a small number of configuration choices for a device, rather than allowing a full permutation of all configuration options. The basic input/output system (BIOS) developer and hardware vendor are in a better position to define configuration choices than the average user. The common user does not typically want to know anything about memory timers, etc., but merely wants to configure a system as "high performance" or "power saving." Further, limiting configuration choices may simplify a method for configuring many identical devices at the same time.

In one embodiment, an administrator or integrator uses a set of scripts that may be run based on a certain platform type. For instance, an administrator wants to configure the settings for the devices such that the devices have certain settings turned on and certain settings turned off. The settings are to be whatever makes sense for a particular situation. The administrator may push those configuration settings (or changes) to the target devices. The set of scripts may be incorporated with a facility currently in use. For instance, an extension to an existing architecture may be used to avoid generating a new system construct, or modifying the system architecture specification. In one embodiment, the internal forms representation construct may be used to implement scripting for managing system configurations. This exemplary extension will be discussed in detail, below.

In one embodiment, configuration data may be composed of internal forms representation (IFR) data. In this context, IFR encoding indicates whether a certain setting is on or off, or specifies an address with a numerical value associated with it, or specifies a value associated with a user password. These settings are all associated with a particular set of IFR data that have been created. The IFR data also have string information associated with it. The use of IFR data provides a space-efficient means of encoding information to represent forms-based interactions. It abstracts string references via tokens. It also tracks configuration information, including the location to save configuration and programmatic default values for a given set of configuration options.

In existing systems the IFR construct is used to enable a user to switch among languages in a typical user interface (UI). ISO-3166 is a standard for describing a language in a three letter manner. For instance, FRA is French, ENG is English, and CHN is Chinese. Each displayed item is considered a "prompt." For instance, upon booting, a user may see a welcome screen in their chosen language. The welcome screen may display, "Hello, <username>, in English. If the system language is changed to Spanish, the prompt may be, "Hola, <username>. A global variable LANG is typically present to identify the current language. Regardless of the current language, the prompt during the welcome screen will have the same semantic meaning. A specific "prompt token" identifies which prompt will be displayed in the UI at a given time. At another point in system execution, the semantic meaning of the prompt token may be, "Do you want to disable serial port 2?" This prompt token will have corresponding prompts in all available languages. Existing system use an IFR construct to store the various language prompts and their identifying tokens in a database. The disclosed method extends this language construct with a scripting language, thus being able to build on existing methods for accessing the UI database.

Referring to FIG. 1, there is shown a representation of a sample IFR op-code encoding according to the disclosed system and method. In this example, the op-code comprises three words of data. The first word comprises an op-code 10, a length 12 and a data offset 14. The second word comprises a prompt token 16 and a help token 18. The third word comprises a width field 20 and flags field 22. The help token field 18 and flags field 22 are potentially optional with regards to the disclosed system and method. They may have no direct correlation to the enabling of scripting. The help token field 18 and flags field 22 are shown to illustrate a "typical" IFR entity.

However, similar to a prompt token as a reference to a string value that illustrates a "question" such as "Do you want to disable serial port 2?", the help token is a UI construct that is a reference to a string value that would illustrate if there were help associated with the question being asked. For instance, a user may be able to press a context sensitive function key to access a help field associated with the current operation, such as "By disabling your serial port, you will not be able to plug items into the serial port and expect them to work appropriately."

The width field 20 defines the size of the configuration data being stored. For instance, if the value associated with the question "What is your Serial Port address?" were to be 0x3F8, the width must be 2. Width defines the number of bytes that are stored in the non-volatile configuration storage. Therefore, when one extracts data, one needs to know how much to retrieve to properly understand the current setting for the given question.

The flags field 22 is a UI construct which directs the internal UI browser to behave in certain ways versus others. The flags field 22 is not used in the disclosed embodiments.

In the past, IFR encoding has been a simple declarative encoding to describe presentation management/user-interface. At least one embodiment, as described herein, extends the IFR infrastructure to allow original equipment manufacturers (OEMs), independent hardware vendors (IHVs) and platform builders to dynamically effect policy and state variable update via interpretation or execution of IFR-based ensembles.

Figure 2:
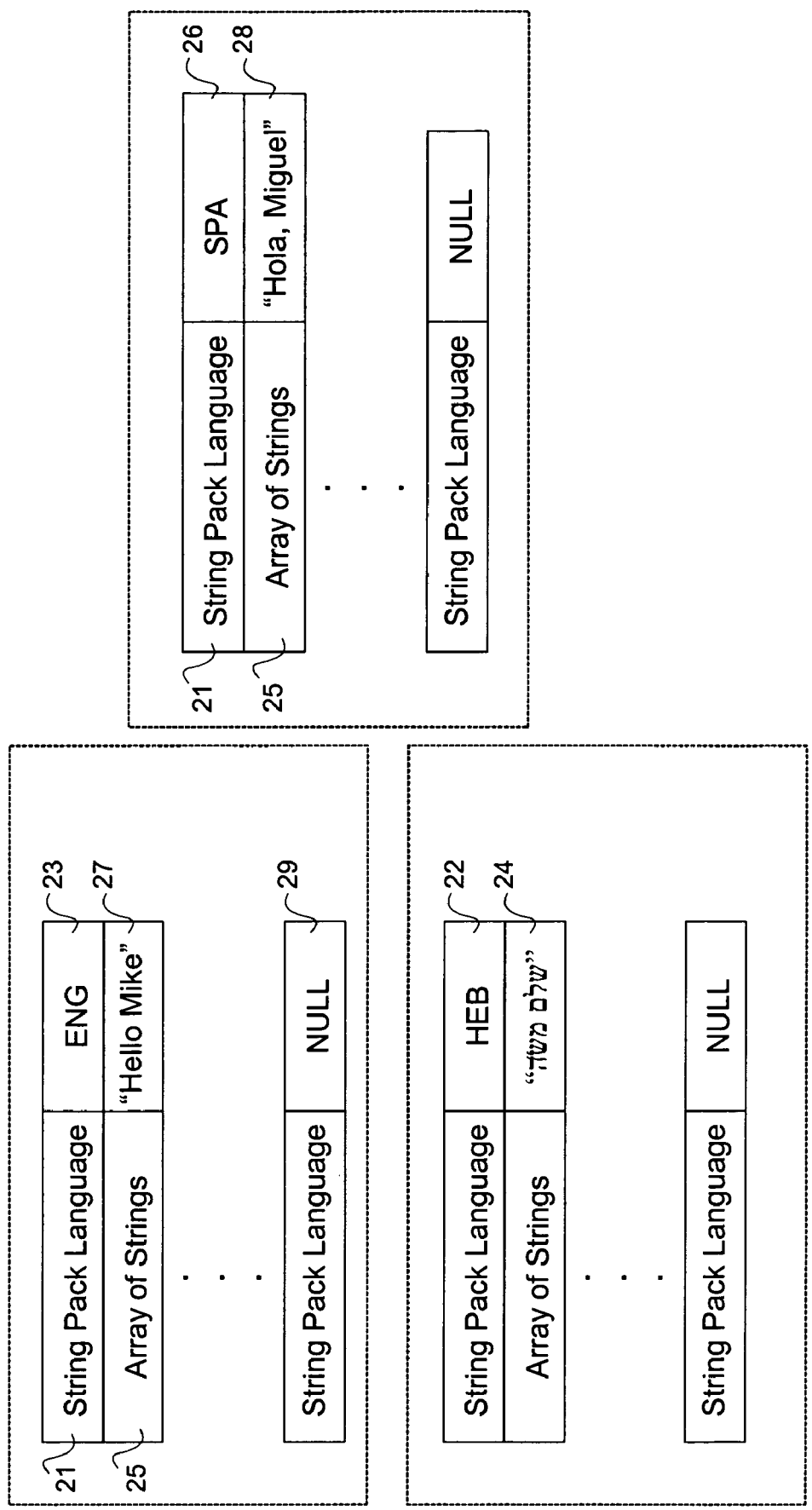
FIG. 2 is a block diagram of an exemplary string data organization using IFRs that is used in the prior art.

FIG. 2 shows an exemplary prior art string data organization using IFRs. The string pack language 21 for English, shown in its three-letter code "ENG" 23 has an array of strings 25. The string "Hello Mike" 27 is an example of the first string in the array, for English. The array of strings continues until the NULL string 29 is encountered. Each string pack is prefaced by its language code. For instance, a HEBrew string pack 22 will have a Hebrew string, for instance, "שלום משה" 24, associated with the same prompt token. A Spanish string pack 26 will have a Spanish string, for instance, "Hola, Miguel" associated with the same semantic prompt token, as well. In normal operation, when the UI needs to display something, it looks to the LANG variable to determine the 3-letter code identifying the language. The executable knows which prompt token, i.e., the semantic string type, to display. The system looks up the string in the array, based on prompt token and current language.

Embodiments of the system and method as described herein provide the ability to seamlessly integrate keyword definitions in the string infrastructure so that a script engine can associate a particular keyword with a given question or set of questions. This is achieved by the embedding of a language that is specific to the new keyword infrastructure which does not fall within one of the standard definitions for languages that the firmware currently honors. Each question will have an associated keyword language entry or series of entries which will enable the association of that question to a keyword, and thus enable the scripting of these keywords with a particular set of settings. Due to the ability for this infrastructure to be used both by the motherboard as well as add-in devices, and the ability to proxy non-volatile configuration data from add-in cards, one can achieve scripting ability on both system board and add-in cards.

Figure 3:
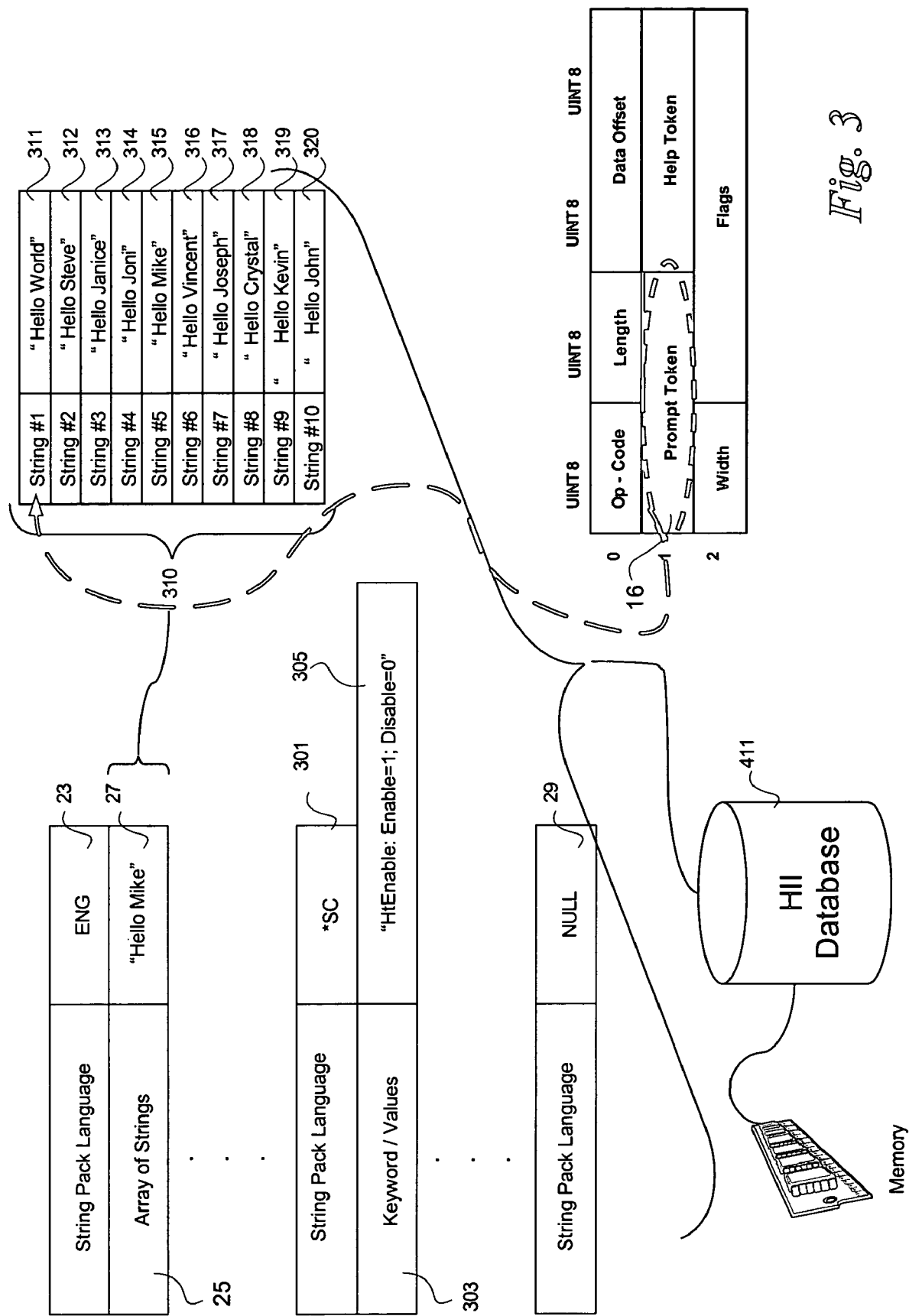
FIG. 3 is a block diagram representing an extension of the IFR string construct according to an embodiment of the disclosed system and method.

FIG. 3 shows an extension of the IFR string construct according to an embodiment of the system and method described herein. The language strings are still in the construct, as before. Block 310 illustrates what an array of strings looks like. For this example, a particular application has 10 strings 311-320. Each string is referred to by its string number, or "token value." For this example, the string package has 10 strings and 10 tokens 1-10. The ENGlish token 5 is the string "Hello Mike" 315, while token 5 in the SPAnish (FIG. 2, 26) string package might be "Hola Miguel" (FIG. 2, 28) and token 5 in the HEBrew (FIG. 2, 22) string package might be "שלום משה" (FIG. 2, 24).

In existing systems, records in a database contain a language code and an "Array of strings" 25, where the strings are associated with prompt tokens for the UI. This construct is extended to include records containing "keywords and values" 303 for a scripting language 301. Thus, the functionality of the language construct is extended to include at least 2 different constructs in the same database space. During normal operations, the records containing a *SC scripting language identifier will not interfere with UI prompting and display because *SC will not be a default language for a system. Thus, the system will not erroneously try to display strings in the keywords and values records 303. During script parsing operations, the script engine has access to the prompt tokens and associated scripting language keywords and values via an existing record structure.

In this example, the keyword "HtEnable" 305 is defined where a value of 1 indicates enable and a value 0 indicates disable. In the *SC string package as shown in the exemplary array of strings, there may be a special definition associated with the "Hello Mike" question, and it too would reside in entry #5 for token 5. In this way, one can associate a question with some interesting keyword without having any additional data beyond what is illustrated below. The extension of the language construct with a scripting language syntax is implementation based, and the disclosed embodiment is only one example of a possible implementation. It will be apparent to one of ordinary skill in the art that an extension of the system may be implemented in a variety of ways to add a scripting construct for configuring the system.

Also shown is a sample IFR op-code encoding, as in FIG. 1, where the prompt token 16 is circled. The prompt token 16 is typically a value in an IFR encoding which corresponds to a given string token. Each configuration IFR op-code contains a prompt token entry 16, and this token is what associates a particular "question" with a given string entry, and then allows a script engine to look in the *SC package to determine the meaning of the question via a Keyword. In the example shown in FIG. 3, prompt token 16 identifies String #1 311. If the LANG variable is ENGlish, then the prompt token 16 identified the string "Hello, World." If the language code is not *SC for the scripting language, then the keyword and value associated with prompt token "1" is identified (the array is not shown).

In addition, the IFR encoding which the firmware uses to achieve the user interface infrastructure will have new definitions for non-volatile variable naming mechanisms. This will be achieved by defining a variable op-code which future op-codes will have their data written to and read from.

In existing systems, there is typically a central data repository for configuration data. This repository may be a memory service. The central data repository is typically an in-memory database that the firmware contains. The components which require configuration are typically inclusive of add-in cards, the motherboard itself. These components may export pertinent configuration information to the central data repository. The data repository is not typically external to the system. The central repository may be called a Human Interface Infrastructure (HII) database. The HII typically holds the IFR encodings for the language and prompting structure.

Figure 4:
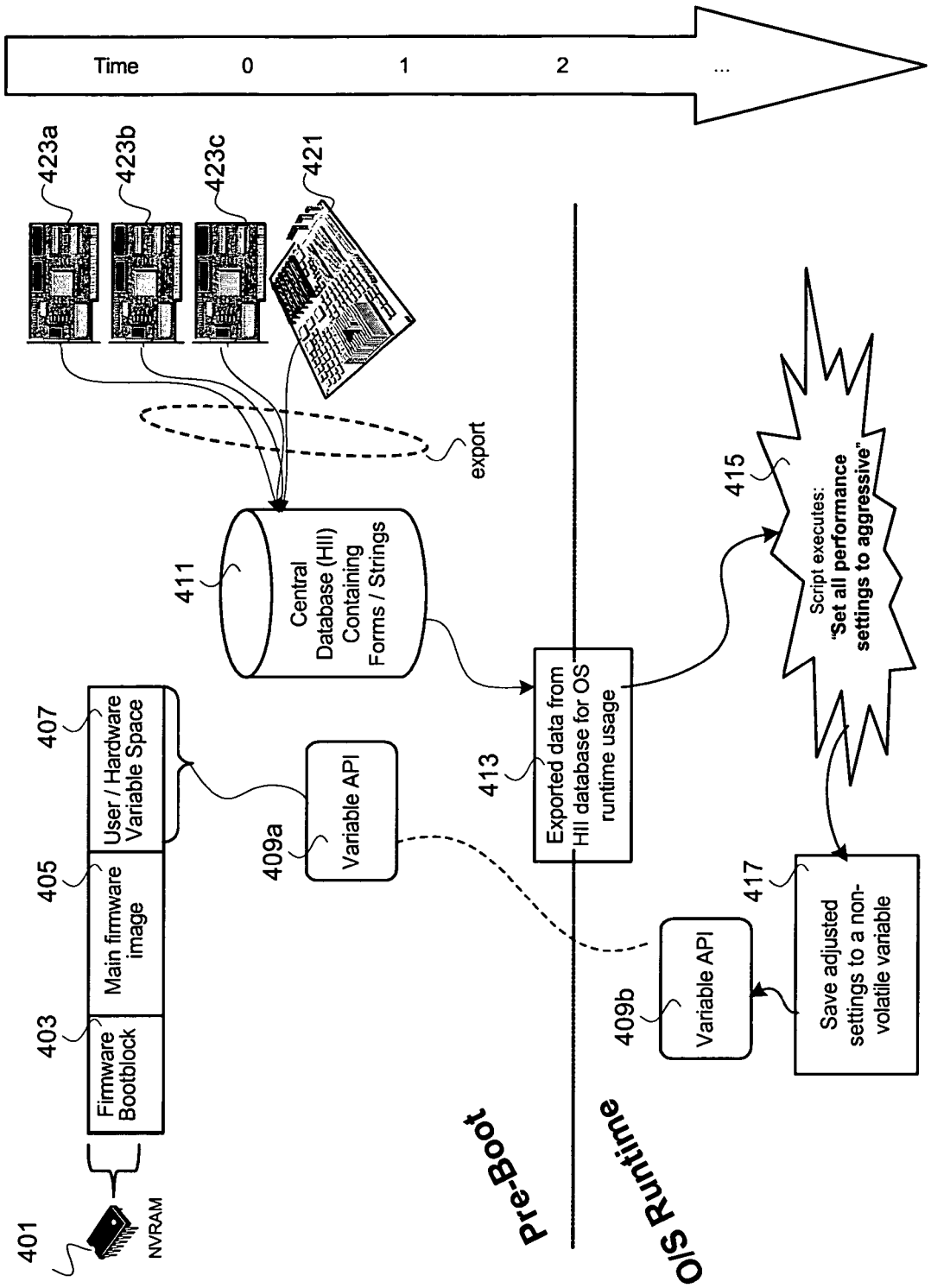
FIG. 4 a block diagram representing the interaction among a scripting engine, configuration database and firmware updates during pre-boot and runtime, according to an embodiment of the disclosed system and method.

Referring now to FIG. 4, there is shown a block diagram representing the interaction among a scripting engine, HII database and firmware updates during pre-boot and runtime, according to an embodiment of the disclosed system. Non-volatile RAM (NVRAM) 401 typically comprises a firmware boot block 403, a main firmware image 405 and user/hardware variable space 407. The variable space 407 may be utilized to effect configuration changes. Firmware may have a non-volatile variable abstraction, i.e., an API 409 which can access the NVRAM, which is available both in pre-boot as well as OS runtime. A variable API 409 is used to modify the firmware variables 407. The API 409 may be invoked by any process that needs to set the configuration data. It will be apparent to one of ordinary skill in the art that various implementations are possible. In one embodiment, the process is a script engine. In another embodiment the process is a configuration daemon. For simplicity, the various methods that may be used to extract and modify the configuration information are generically identified in this discussion by the term "script engine." By extracting the configuration data of a particular database entry in the HII database 411, keywords may be retrieved. The keyword is associated with a particular configuration choice. This association enables scripting capabilities for the main system board (motherboard 421) and associated add-in devices 423*a-c*. The configuration information for the motherboard 421 and add-in devices 423 is exported into the HII database 411. Two new elements may be introduced in the export data that do not exist in present day systems: 1) the ability for forms data to reference multiple NVRAM variables for configuration storage, and 2) seamlessly introducing keyword associations with configuration questions in string data.

The exported data 413 may be accessible during runtime. A script selecting, for instance, "Set all performance settings to aggressive" 415 may be parsed during runtime using the IFR language interface.

A script may take the form of a series of <Keyword><Value> pairs in a text file which is used by a configuration script interpreter, or script engine. This operation is analogous to an executable consuming a text file which contains the configuration script. The configuration script may be a series of items as follows:

| | |
|---|---|
| HtEnable | Enabled |
| Serial1Enable | Enabled |
| Serial2Enable | Disabled |
| Parallel1Enable | Enabled |
| Parallel2Enable | Enabled |

Using the example above, the configuration script interpreter (script engine) may interpret the script line-by-line and then search the HII database for the matching op-code which contains the keyword identified in the text file, i.e., "HtEnable". The script interpreter extracts the data offset where the configuration setting resides from the op-code, and updates the corresponding configuration setting.

However, since a given question may have several keywords associated with it, the script text file may use overarching keywords that affect more than one setting. For instance, the script may enable a single overriding directive such as:

| | |
|---|---|
| SpeedyBoot | Enabled |

This keyword effectively requests the script interpreter to search all of the IFR entries for any item that supports "SpeedyBoot" keyword. The appropriate configuration settings will then be set to enable SpeedyBoot. The prior example of keyword "HtEnable", "Serial1Enable", etc. may be a subset of the SpeedyBoot Global setting.

The script engine, interpreter, or similar implementation, determines which configuration settings should be modified based on the keyword/question and sets the adjusted settings to a non-volatile variable 417. The Variable API 409A (pre-boot) or 409B (runtime) are invoked by the script engine (not shown), or configuration daemon, etc., to modify the user/hardware variable space 407. The choice of where the variables are stored is dependant on the data retrieved from the IFR op-code. The retrieved "data offset" indicates where to modify the data in the non-volatile variable. This variable typically subsumes the configuration settings for many questions. The retrieved "data offset" is used in order to disambiguate one question's setting from another's.

Figure 5:
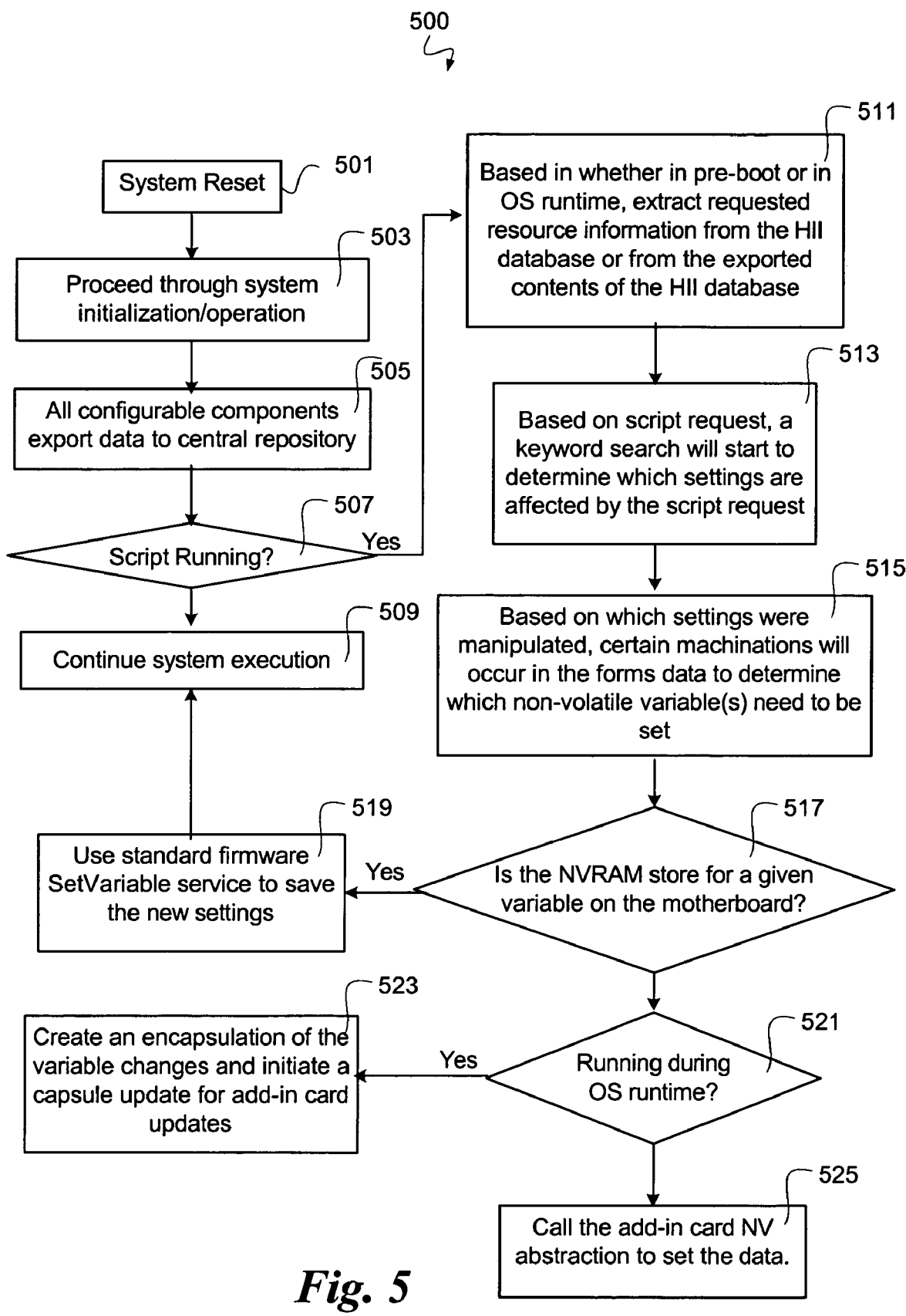
FIG. 5 is a flow diagram of an exemplary method for pushing scripted configuration settings to one or more devices, according to an embodiment of the disclosed system and method.

FIG. 5 is a flow diagram of an exemplary method 500 for pushing scripted configuration settings to one or more devices. In order to effect a configuration change, the device typically needs to be reset (block 501). During system reset, the firmware goes through its normal initialization operation (block 503). In one embodiment, all configurable components may be exported to the central data repository in block 505.

A script may contain one or more configuration settings or changes. The script may be parsed and executed during system reset and initialization, as well as during runtime. During system reset, if a configuration script is not running, the device continues with normal system execution in block 509. If a script is running, then information must be extracted from the HII database in block 511.

If the system is in pre-boot mode, the information may be extracted directly from the HII database. During pre-boot, the HII database may be an in-memory database having application program interfaces (APIs). Components may register and query the HII database like any other database.

If the system is in operating system (OS) runtime, then the information may be extracted from exported contents of the HII database. When a system transitions from pre-boot to OS runtime, a signal typically is sent (a logical signal) indicating that the transition is imminent. In response to the signal, components are warned that they should perform a clean up, if necessary. The transition signal is a trigger that may cause the HII database to register its information with the configuration table. The HII database may export its contents into a long contiguous buffer. The pointer to the buffer may be placed into the configuration table so that an application in the OS runtime environment is able to extract the information.

Based on a script request, a keyword search may be performed to determine which settings are affected by the script request in block 513.

FIG. 6 shows exemplary background structure definitions to assist in this discussion. These structures illustrate an embodiment of the form of data that may be exported by one of the script engine services. The described data may be data used to search against by the script engine. It will be apparent to one of ordinary skill in the art that these exemplary structures are just reasonable examples of data retrieval and not the only means by which one can perform data exports.

During the execution of a script, a keyword is traversed in an EXPORT_TABLE 610. The EXPORT_TABLE 610 may have an array of EFI_HII_DATA_TABLE entries 611. An exemplary structure for the EFI_HII_DATA_TABLE 620 is also shown. In each of the data table entries, there may be StringData 621, IfrData 623, and VariableData 625. The script engine finds the appropriate StringData entry 621 which is in a *SC string package. From the string number where the keyword was found (for this example, assume it was string #5), the IfrData 623 may now be traversed to find an op-code which references "prompt token #5." Upon finding this op-code, all of the configuration related data becomes accessible, such as an offset of the data and size of the data. Also, the VariableData 625 is an exemplary snapshot of the current contents on the non-volatile variable storage. This is exported for convenience and not so much more the absolute necessity of the information.

In one embodiment, configuration data may be composed of internal forms representation (IFR). IFR encoding indicates whether a certain setting is on or off, or it may be an address with a numerical value associated with it, or it may be a value associated with a user password. These settings are all associated with a particular set of IFRs that have been created. As discussed above, the IFR also has string information associated with it. For instance, in a machine that may be capable of hyperthreading, a question might be posed such as, "Do you want to enable hyperthreading?", where hyperthreading is a new feature in some of the processors. The data associated with that string may have three basic components: 1) a string containing, "Do you want to enable Hyperthreading?" ; 2) IFR op-codes; and 3) the actual configuration setting itself. Overloading the language construct one way to store the script information in a standard format and record structure without creating new types of records in the database.

The configuration setting may take several forms based on a chosen implementation. It will be apparent to one of ordinary skill in the art that how one chooses to enable the configuration setting is greatly dependant on implementation choices. In one embodiment, an example format is a series of <Keyword><Value> pairs in a text file which are used by a configuration script interpreter. This is analogous to an executable which consumes a text file which contains the configuration script. The configuration script may be a series of items such as:

| | |
|---|---|
| HtEnable | 1 |
| Serial1Enable | 1 |
| Serial2Enable | 0 |
| Parallel1Enable | 1 |
| Parallel2Enable | 1 |

In this embodiment, the executable interprets the script line-by-line and then searches the HII database 411 for the matching op-code. The op-code contains the keyword. The executable extracts a data offset from the op-code. The data offset indicates where the configuration setting resides. The executable may then update the corresponding configuration setting.

The components of this question may be in the HII database. Each string may have several language translations. An interpreted set of op-codes indicate when to use a specific string token, where the string token is referring to the string "Do you want to enable hyperthreading?" Embedding the string in the op-code may be inefficient, so in one embodiment, the string is given a numerical value. The string token has a reference to a specific string in the HII database. The string has the same numerical value regardless of which language is in effect. A machine may be capable of enabling n number of languages, but each concept (i.e., "Do you want to enable Hyperthreading?") typically has only one string token.

For a specific configuration setting, 0 may indicate "disabled" and 1 may indicate "enabled." The configuration value is typically stored in non-volatile RAM in a variable. The keyword search in the block 513 utilizes these three components.

Existing systems are capable of prompting the user in multiple languages. Thus, the language construct exists. In one embodiment, the language construct of IFR is overloaded with a "script language" type. At specific times during normal operation, the language code is checked and the appropriate language string is displayed. Prior to the display of the first text to the screen, the current language is typically checked. Prior to the printing of data to the screen, the language may be checked every time. The reason for this is a user might change the current language while running or before the next boot.

In one embodiment, this existing construct is extended with an artificial language definition meaning script language. An example three letter code may be "*SC" (FIG. 3, 301) for a scripting language. When the system reads an *SC language code, the system interprets it as a non-printable string. Keyword information may be encoded in the string. For instance, some desirable system configurations may be related to preferred system behavior, i.e., high performance. For preferred high performance, "Performance" may be a keyword. Suppose there are 100 settings on a particular machine. Suppose three of them actually affect performance. For instance, one might want to skip the memory testing in order to boot more quickly. The "Performance" keyword may be associated with specific configuration settings to effect a desired system behavior with respect to those three settings. In most embodiments, the *SC "language" would not be a choice given to the end-user, so switching from a valid language to *SC would not be possible. The frequency of the language check should not be affected by the extension of the *SC scripting language.

A unique set of keywords may be associated with a particular token. Multiple keywords may apply to a given token. For instance, one particular setting might apply to making a system "speedy" while it also may apply to placing the system in "Server" mode versus a "Workstation". In one embodiment, the keyword is placed in the script, not the token value. The keywords are part of the string in the string pack language for the *SC scripting language pack. A certain set of valid parameters may be enumerated in each keyword. For instance, if performance is a keyword, then following the keyword may be a list of terms, e.g., "aggressive", or "fast", or "slow", or "debug". Each term may have a particular set of meanings depending on a list of what a platform is capable of supporting, namely, the type of behavior desired from the system. Each term associated with a keyword has a value. Performance may be a keyword and the terms or modifiers of the keyword, such as "fast", each may have a value. Each configuration choice is parsed during the script execution by the script engine. Each configuration choice may have a unique string associated with it.

For example, if the administrator wants to set all performance of the system to "fast" then the script is written to indicate this preference. When the script is run by a script engine in block 513, the configuration op-codes (i.e., IFR op-codes ) are parsed. The op-code may reference a string code, i.e., performance. Based on the string token the script engine determines whether a script language translation exists. If so, the script engine looks for the particular string token. If found, then it determines which settings are to be manipulated in block 515.

For instance, in one embodiment, the non-volatile random access memory (NVRAM) store for a given variable may be on the motherboard, as determined in block 517. If so, then a firmware construct, such as SetVariable service may be used to save the new settings in block 519. Otherwise, if the script is running during OS runtime as determined in block 521, then an encapsulation of the variable changes may be created and a capsule update may be initiated for add-in card updates in block 523. If the NVRAM variable is not on the motherboard, and it is not OS runtime, then the add-in card NV abstraction may be called to set the data in block 525.

An independent hardware vendor (IHV) typically will decide which configurations affect which system characteristics. A system integrator or system administrator may define that the "performance" keyword exists, and what components must be modified, or configured, to accommodate the selection, i.e., "fast". Memory characteristics may, for instance, affect performance. The integrator may have a list of keywords that can be implemented in the system, and possible settings for keywords. The integrator generates the script based on the desired configuration.

Each corresponding IHV will typically create the list of configurable items in the component. They can define whatever settings they prefer. For instance, the motherboard might have a performance setting that is applicable. This would likely be part of the release notes for the product. The IHV describes the configurable items supported by the motherboard. This may also be true for an add-in card. A motherboard might have an IHV-defined keyword "Performance" with modifiers of "Speedy" and "Mopey". The add-in card might have IHV-defined keyword "Boot-speed" and modifiers of "Fast" and "Slow". The integrator is aware of all keywords and modifiers for system components and selects the desired set in the script.

In one embodiment, when configuration changes are made using the script engine, a warm reset is initiated. Upon reboot, the firmware looks for pending capsules. Pointers may be put into the configuration table to identify the pending capsules. The firmware will launch the capsules to effect the configuration changes. The capsules may be responsible for calling the add-in card non-volatile storage abstractions and updating the changes that were made during OS runtime.

If the desired change affects variables on the motherboard, and the change is requested during OS runtime the variable may be updated directly. A set variable command may be called to update the NV store in the motherboard with motherboard configuration settings or add-in card settings, if they exist on the motherboard.

In one embodiment, if the Script is run during OS runtime it may reset/reboot the system. This method is similar to a patch or security update in that it is pushed to the system. If no scripting entry exists for an item, it is acceptable. It just means the entry will not be scriptable. This is the standard operation of the system. If the construct does not exist, then the system works exactly like it used to.

In one embodiment, a system integrator desires to configure 100 systems identically. The integrator creates a master variable or master set of variables. The master variable (i.e., script) is pushed to all targets. Each of the 100 systems may have an OS present agent, e.g., script engine, which will proxy the information for them. In one embodiment, the script engine runs locally on a machine and constructs the variable(s), then pushes the variable(s) to targets, i.e., the non-volatile storage which corresponds to where the configuration data for the target machine is stored. Thus, the script may not have to run on each target machine. In another embodiment, a daemon runs on the target systems and waits for the script requests. Upon receipt of a request, the target system follows a method 500 from block 507.

The resultant information required to modify the configuration settings is the contents of the non-volatile storage settings. This method is viable even if information is stored on the add-in card. It will be apparent to one of ordinary skill in the art that various implementations may pass the scripting data in numerous ways. On boot, the variables are typically pushed to the HII database. Thus, the last known settings may be extracted and modified or utilized.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for managing a configuration for a computer system, comprising:
   exporting configuration data corresponding to a plurality of configurable components to a central data repository during pre-boot;
   determining whether script engine is running;
   if the script is running, then in response to a script request, extracting requested resource information;
   searching a plurality of keywords to determine settings to be affected by the received script request;
   determining at least one action to be performed in response to the script request; and
   performing the at least one action.

2. The method as recited in claim 1, wherein extracting requested resource information comprises extracting information from one of the central data repository and exported contents of the central data repository.

3. The method as recited in claim 2, wherein extracting requested resource information from the central data repository is performed during pre-boot and extracting exported contents of the central data repository is performed during runtime.

4. The method as recited in claim 2, wherein a pointer in a configuration table points to the exported contents of the central data repository, making the exported contents available during runtime.

5. The method as recited in claim 1, wherein the at least one action is selected from the group consisting of storing configuration settings in a non-volatile variable, creating an encapsulation of configuration variable changes, initiating a caps tile change update for add-in card updates, executing an add-in card abstraction to set add-in card configuration data, and stating configuration updates in non-volatile random access memory (NVRAM) on a motherboard.

6. The method as recited in claim 1, wherein the central data repository is an in-memory database having application program interfaces (APIs).

7. The method as recited in claim 1, wherein configuration data is in a form of internal forms representation (IFR).

8. The method s recited in claim 7, further comprising:
   extending a language construct with a scripting language;
   parsing the scripting language by the script engine; and
   if the script engine is not running, ignoring scripting language elements.

9. The method as recited in claim 8, wherein scripting language elements comprise keyword information, the keyword information indicating a class of configuration settings.

10. The method as recited in claim 8, wherein scripting language elements comprise keyword and value pair information, the keyword arid value pair information indicating a specific configuration setting, further comprising searching the central data repository for an op-code corresponding to the keyword and value pair.

11. The method as recited in claim 8, further comprising:
    extracting a data offset from an op-code corresponding to a scripting language element; and
    determining a location for a requested configuration change based on the data offset.

12. The method as recited in claim 8, further comprising initiating a warm reset of the computer system in response to changing configuration settings.

13. The method as recited in claim 12, further comprising: identifying pending configuration change capsules; and launching the pending capsules to effect the configuration change.

14. A method for managing a configuration for a target computer system, by a managing computer system, comprising:
    generating a master set of configuration variables by a managing computer system, wherein the set of configuration variables correspond to a plurality of configurable components coupled to the target computer system, the generating comprises running a script engine; searching a plurality of keywords to determine settings to be affected by a received script request; and creating a representation of configuration settings for use by at least one target computer system;
    pushing the master set of configuration variables to at least one target computer system;
    receiving the master set of configuration variables by at least one target computer system; and
    applying the master set of configuration variables by the at least one target computer.

15. The method as recited in claim 14, wherein applying the master set of configuration variables comprises:
    retrieving data offsets corresponding to configuration settings from a central data repository; and
    modifying configuration settings based on the retrieved data offsets.

16. A machine accessible storage medium having instructions stored thereon for managing a configuration of components coupled to a computer system that when the instructions are executed on a machine, cause the machine to:
    extract requested resource information from a received script request;

search a plurality of keywords to determine settings of one or more of the components to be affected by the received script request;
determine at least one action to be performed in response to the script request; and perform the at least one action.

17. The machine accessible storage medium as recited in claim 16, wherein extracting requested resource information comprises extracting information from one of a central data repository and exported contents of the central data repository.

18. The machine accessible storage medium as recited in claim 17, wherein extracting requested resource information from the central data repository is performed during pre-boot and extracting exported contents of the central data repository is performed during runtime.

19. The machine accessible storage medium as recited in claim 17, wherein a pointer in a configuration table points to the exported contents of the central data repository, making the exported contents available during runtime.

20. The machine accessible storage medium as recited in claim 17, wherein the central data repository is an in-memory database having application program interfaces (APIs).

21. The machine accessible storage medium as recited in claim 16, wherein the at least one action is selected from the group consisting of storing configuration settings in a non-volatile variable, creating an encapsulation of configuration variable changes. initiating a capsule change update for add-in card updates, executing an add-in card abstraction to set add-in card configuration date, and storing configuration updates in non-volatile random access memory (NVRAM) on a motherboard.

22. The machine accessible storage medium as recited in claim 16, wherein the instructions further cause the machine to:
extend a language construct with a scripting language;
parse the scripting language by a script engine; and if the script engine is not running, ignore scripting language elements.

23. The machine accessible storage medium as recited in claim 22, wherein scripting language elements comprise keyword information, the keyword information indicating a class of configuration settings.

24. The machine accessible storage medium as recited in claim 22, wherein scripting language elements comprise keyword and value pair information, the keyword and value pair information indicating a specific configuration setting, further comprising searching the central data repository for an op-code corresponding to the keyword and value pair.

25. The machine accessible storage medium as recited in claim 22, wherein the instruction further cause the machine to:
extract data offset from an op-code corresponding to a scripting language element; and
determine a location for a requested configuration change based on the data offset.

26. The machine accessible storage medium as recited in claim 22, wherein the instructions further cause the machine to initiate a warm reset of the computer system in response to changing configuration settings.

27. The machine accessible storage medium as recited in claim 26, wherein the instructions further cause the machine to:
identify pending configuration change capsules; and
launch the pending capsules to effect the configuration change.

28. A system for managing a configuration for a computer system. comprising:
a processor capable of executing instructions comprising a language construct, the language being capable of identifying a plurality of strings corresponding to a plurality of languages for use with a user interface;
a central data repository communicatively coupled to the processor, the central data repository having configuration data related to the processor and at least one component operatively coupled to the processor;
an extension of the language construct, the extension capable of comprehending a script language, wherein the script language identifies configuration settings for at least one of the processor and related components; and
a script engine capable of parsing the script language, wherein the script engine has access to the central data repository to determine where configuration settings reside.

29. The system as recited in claim 28, wherein the central data repository is an in-memory database.

30. The system as recited in claim 28, wherein the components related to the processor export configuration information to the central data repository.

31. The system as recited in claim 28, wherein the script language is parsed during one of pre-boot arid runtime.

32. The system as recited in claim 28, wherein in response to a script language element, the script engine searches the central data repository for an op-code corresponding to the script language element.

33. The system as recited in claim 32, wherein the op-code comprises a keyword, and a data offset, the data offset identifying a location for the configuration setting.

34. The system as recited in claim 33, wherein the op-code is associated with a token and the token is associated with a unique set of keywords.

* * * * *